United States Patent
Walter et al.

(10) Patent No.: US 10,499,192 B2
(45) Date of Patent: Dec. 3, 2019

(54) PROXIMITY-BASED DEVICE SELECTION FOR COMMUNICATION DELIVERY

(71) Applicant: T-Mobile USA, Inc., Bellevue, WA (US)

(72) Inventors: Jennifer Lynn Walter, Bellevue, WA (US); Jason W. Valalik, Shoreline, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 283 days.

(21) Appl. No.: 13/829,071

(22) Filed: Mar. 14, 2013

(65) Prior Publication Data

US 2014/0280541 A1    Sep. 18, 2014

(51) Int. Cl.
G06F 15/16 (2006.01)
H04W 4/02 (2018.01)

(52) U.S. Cl.
CPC .................. H04W 4/027 (2013.01)

(58) Field of Classification Search
CPC ......... H04L 67/02; G06F 17/00; G06F 15/00; H04W 4/029; H04W 88/04
USPC ......... 709/204, 206, 217, 239, 225; 701/201
See application file for complete search history.

(56) References Cited

U.S. PATENT DOCUMENTS

| | | | | |
|---|---|---|---|---|
| 6,108,709 | A * | 8/2000 | Shinomura | H04L 12/2856 709/239 |
| 6,865,385 | B1 * | 3/2005 | Kohda et al. | 455/414.1 |
| 7,298,831 | B1 * | 11/2007 | Keohane et al. | 379/88.23 |
| 7,424,302 | B2 * | 9/2008 | Carpenter | H04L 12/189 370/312 |
| 7,461,378 | B2 * | 12/2008 | Beyda | 719/313 |
| 7,496,630 | B2 * | 2/2009 | Arellano | H04L 12/581 709/206 |
| 7,716,289 | B2 * | 5/2010 | Malik | G06Q 10/107 455/403 |
| 7,870,264 | B2 * | 1/2011 | Clark et al. | 709/227 |
| 8,103,304 | B1 * | 1/2012 | Miller | H04M 1/72569 455/550.1 |
| 8,634,788 | B2 * | 1/2014 | Wright et al. | 455/238.1 |
| 8,799,380 | B2 * | 8/2014 | Odell et al. | 709/206 |
| 8,823,507 | B1 * | 9/2014 | Touloumtzis | H04L 67/24 340/501 |
| 8,849,253 | B2 * | 9/2014 | Nasir | H04W 4/001 455/404.1 |
| 8,856,383 | B2 * | 10/2014 | Beninato | H04L 29/06 709/224 |
| 9,491,251 | B2 * | 11/2016 | Deeter | H04L 67/26 |
| 2003/0200266 | A1 * | 10/2003 | Henry | H04L 29/06 709/206 |

(Continued)

Primary Examiner — Duyen M Doan
(74) Attorney, Agent, or Firm — Han Santos, PLLC

(57) ABSTRACT

Techniques and devices for selection of an online communication device based on user proximity and for transmission of a communication to the selected online communication device are described herein. The techniques include either receiving device data from one or more online communication devices and determining proximity of the devices to a user based on the device data or receiving proximity information indicative of the proximity of the user to the one or more online communication devices. Based on the determined proximity or proximity information, one of the one or more online communication devices is selected, and a communication is transmitted to the selected online communication device.

19 Claims, 5 Drawing Sheets

(56) References Cited

U.S. PATENT DOCUMENTS

| | | | |
|---|---|---|---|
| 2006/0073839 A1* | 4/2006 | Gorday et al. | 455/456.2 |
| 2007/0165623 A1* | 7/2007 | Clark | H04L 67/24 370/389 |
| 2008/0025307 A1* | 1/2008 | Preiss | H04L 67/26 370/392 |
| 2008/0225760 A1* | 9/2008 | Iyer | H04W 52/0235 370/310 |
| 2009/0254975 A1* | 10/2009 | Tumbull | H04L 63/0492 726/3 |
| 2010/0262361 A1* | 10/2010 | Matz | 701/201 |
| 2011/0083111 A1* | 4/2011 | Forutanpour et al. | 715/863 |
| 2012/0036261 A1* | 2/2012 | Salazar | H04L 67/24 709/225 |
| 2012/0079018 A1* | 3/2012 | Rottler | H04M 1/72572 709/204 |
| 2012/0117161 A1* | 5/2012 | Best | G06Q 10/107 709/206 |
| 2012/0142378 A1* | 6/2012 | Kim | H04N 21/4394 455/456.6 |
| 2013/0136089 A1* | 5/2013 | Gillett | H04W 72/048 370/329 |
| 2013/0198307 A1* | 8/2013 | Ruetschi | H04L 67/16 709/206 |
| 2013/0212176 A1* | 8/2013 | Koulomzin | G06Q 50/01 709/204 |
| 2013/0331127 A1* | 12/2013 | Sabatelli | H04W 4/021 455/456.3 |
| 2014/0075464 A1* | 3/2014 | McCrea | G06F 19/3418 725/14 |
| 2014/0128021 A1* | 5/2014 | Walker et al. | 455/405 |
| 2014/0172953 A1* | 6/2014 | Blanksteen | H04W 4/02 709/203 |
| 2015/0382166 A1* | 12/2015 | Ferraz | H04L 51/10 455/414.4 |

* cited by examiner

PROXIMITY-BASED DEVICE SELECTION FOR COMMUNICATION DELIVERY

BACKGROUND

Communication devices, also called telecommunication devices, have evolved from mobile replacements for the telephone to all-in-one communication, media, and productivity solutions. In addition to voice calling, telecommunication devices now support video and song playback, calendaring, and a variety of other features. Such features include web browsing, video streaming, video chat, and many others. Additionally, communication devices now include a wide variety of device types, including cellular phones, personal computers (PCs), personal digital assistants (PDAs), tablet computers and media players. These devices may be configured with communication clients that enable the devices to be online with respect to a communication service, such as a service for instant messaging, text messaging, video calling, voice calling, social networking, email, or gaming, a media server, or a mobile wallet service.

Often a given user will have multiple communication devices, such as a cellular phone, a tablet computer, and a PC. And frequently, each of the communication devices will be online with respect to a communication service at the same time as the others. Thus, when a new instant message is received by an instant messaging service for a user, that instant message is transmitted to all online communication devices at a same time. The user may, however, be away from one or more of the online communication devices, allowing instant messages to accumulate unread on those devices while they are read on others. This creates an annoying experience for the user when he or she returns to those devices, forcing the user to review, as "unread," messages that have been read on another device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
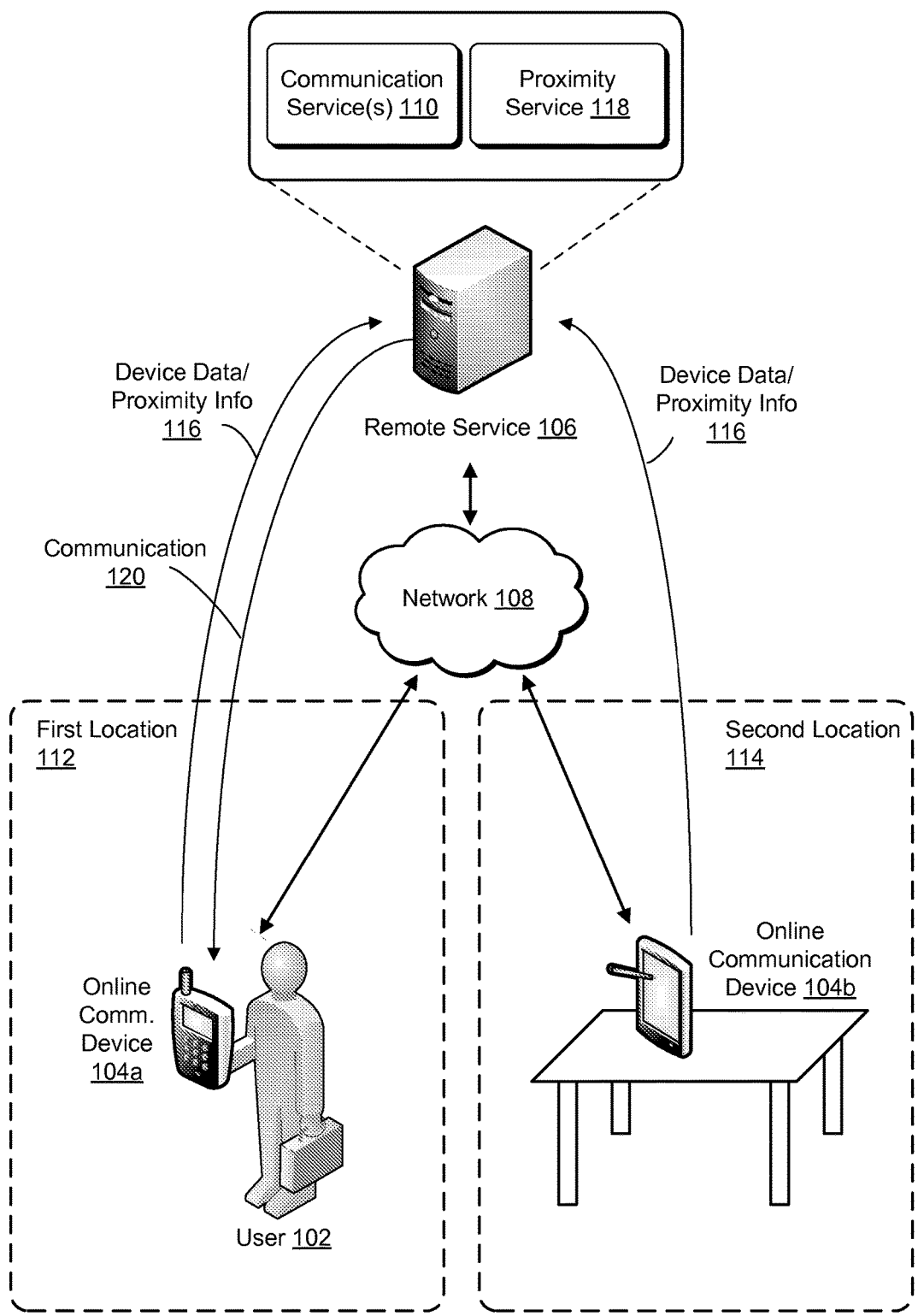
FIG. 1 illustrates an example environment in which a user has multiple communication devices that are online with respect to a communication service while the user is only proximate to subset of those devices.

This disclosure describes, in part, techniques for selection of an online communication device based on user proximity and for transmission of a communication to the selected online communication device. The techniques may include receiving device data from one or more online communication devices of a user and determining proximity of the devices to that user based on the device data. Alternatively, the techniques may involve receiving, from the one or more online communication devices, proximity information indicative of the proximity of the user to the one or more online communication devices. Based on the determined proximity or proximity information, one of the one or more online communication devices is selected, and a communication is transmitted to the selected online communication device.

In various embodiments, the techniques described herein may be performed entirely or in part by a service that is remote from the online communication devices. The remote service may be associated with or part of a network operator, or may be a separate application service provider reachable via a network. The remote service may include both a proximity service and one or more communication services. The one or more communication services may be associated with any or all of instant messaging, text messaging, video calling, voice calling, email, gaming, or social networking. The online communication devices are referred to as "online" because they are online (e.g., logged in) with respect to the communication service(s). In other embodiments, the proximity service may be integrated into the communication service(s) or provided by a different device or entity than the communication service(s).

Each of one or more of the online communication devices determines device data indicative of user proximity. Each may then use the device data to determine user proximity or may provide the device data to the remote service for the remote service to determine user proximity. Example device data may include one or more of i) data indicating activity of accelerometers or electronic compasses of the one or more online communication devices, ii) readings of heat sensors one or more online communication devices, iii) data indicating detection of the user's voice in ambient sound, iv) device speeds of the one or more online communication devices, v) data indicating connections to a WiFi network by the one or more online communication devices, or vi) an image or images captured by cameras of the one or more online communication devicess. In determining user proximity, the online communication device or the remote service may utilize any type of device data (e.g., device speed) in isolation, or may utilize a combination of device data types (e.g., device speed and detection of a user's voice in ambient sound). Also, the online communication device or the remote service may utilize models associated with any of the device data types (e.g., a model of heat sensor readings).

Example Environment

FIG. 1 illustrates an example telecommunication device routing module for intelligently selecting network connectivities to use for transmission of network packets. As illustrated, a user 102 may have a plurality of online communication devices 104 (such as online communication device 104a and online communication device 104b) that communicate with a remote service 106 over a network 108. The online communication devices 104 may be online with respect to a communication service 110 of the remote service 106 (e.g., logged into the communication service 110). The online communication devices 104 may be at different locations, such as first location 112 and second location 114, with the user 102 being present at only the first location 112. Some or all of the online communication devices 104 may determine device data indicative of proximity of the user 102 and may also determinate proximity of the user 102 based on the device data. Those online communication devices 104 may then provide the device data 116 or proximity information 116 indicative of the determined proximity to a proximity service 118 of the remote service 106. The proximity service 118 selects one of the online communication devices 104 based at least in part on a determined proximity of the selected online communication device 104 and transmits a communication 120 to the selected online communication device 104.

Figure 3:
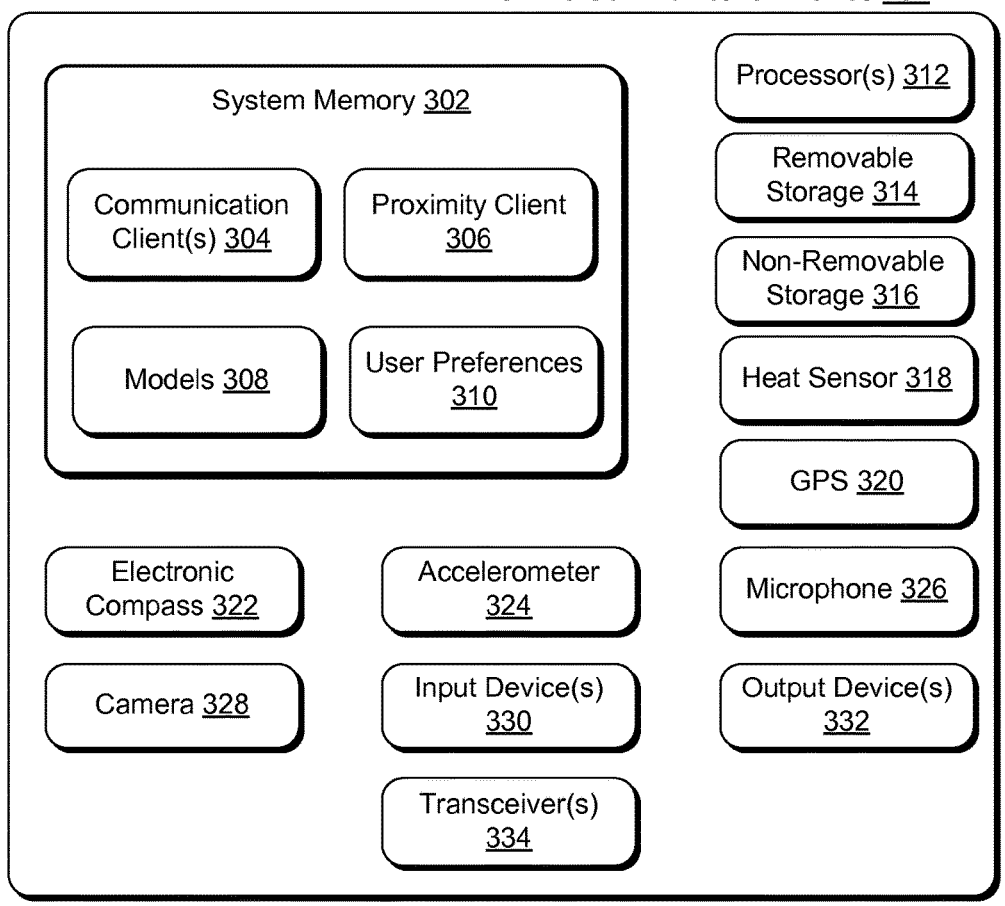
FIG. 3 illustrates an example online communication device configured to determine device data indicative of user proximity and, optionally, to determine proximity of a user based on the device data.

In various embodiments, the online communication devices 104 may each be any sort of device capable of engaging in wireless communication with other, remote devices. For example, one of the online communication devices 104, such as online communication device 104a or online communication device 104b, may be any of a smart phone, a tablet computer, a personal digital assistant (PDA), a personal computer (PC), a laptop computer, a media center, a work station, etc. The others of the online communication devices 104 may be devices of the same type or of different type(s). An example online communication device 104 is illustrated in FIG. 3 and described below with reference to that figure.

Further, the online communication devices 104 may be multiple devices of one user 102. The user 102 may have a single service plan or multiple service plans that enable the devices 104 of the user 102 to have wireless connectivity over the network 106. The user 102 may also have an account or identifier with one or more communication services 110. For example, the user 102 may have an account with an instant messaging service. Clients for that communication service 110 may be installed on multiple ones of the communication devices 104, enabling the multiple communication devices 104 to be online with respect to the communication service 110 at a same time. And because the multiple communication clients for a communication service may also be associated with a single user account with that service, messages or other sorts of communications directed to that user account may be transmittable to any or all of the clients. As described herein, a proximity service 118 associated with the communication service 110 selects a single one of the online communication devices 104 to receive the message communication.

In various embodiments, the network 108 may represent any sort of network or networks, such as a cellular network (circuit-based, packet-based, or both), a WiFi network, a wide access network (WAN), a local area network (LAN), or the Internet. An example cellular network 108 may include a base station (e.g., a node B or an eNode B), a radio network controller (RNC), and/or a core network. A network 108 that is a non-cellular data network, such as a WiFi network, may include an access point device for sending and receiving wireless transmissions. These access devices may in turn be associated with an Internet service provider that provides connectivity to the Internet. Further, the network 108 may include private network(s), public network(s), or both.

In some embodiments, the remote service 106 may be associated with or part of a network operator (such as the network operator associated with network 108), or may be a separate application service provider reachable via the network 108. The remote service 106 may include both the proximity service 118 and one or more communication services 110. The one or more communication services 110 may be associated with any or all of instant messaging, text messaging, video calling, voice calling, email, gaming, or social networking. And as mentioned above, the online communication devices 104 are referred to as "online" because they are online (e.g., logged in) with respect to the communication service(s) 110. In other embodiments, the proximity service 118 may be integrated into the communication service(s) 110 or provided by a different entity than the communication service(s) 110.

As is further illustrated in FIG. 1, the user 102 may have an online communication device 104a at a first location 112, such as an office or transportation, and an online device 104b at a second location 114, such as home. For example, the user 102 may have a cellular phone (which may be online communication device 104a) at the user's office (which may be the first location 112) and a tablet computer (which may be the online communication device 104b) at the user's home (which may be the second location 114). The first and second locations 112 and 114 may be any locations. In some embodiments, they may even be different places within a "same" location (e.g., different rooms in a house, or different spots in a room). What distinguishes the first location 112 from the second location 114 is that the user 102 is proximate to the online communication device 104a while at the first location 112 and is not proximate to the online communication device 104b, which is at the second location 114. Proximity may in turn depend on device data sensed by one or more different modalities of the online communication devices 104.

In various embodiments, that device data may include one or more of i) data indicating activity of accelerometers or electronic compasses of an online communication device 104, ii) reading(s) of heat sensor(s) of the online communication device 104, iii) data indicating detection of the user's voice in ambient sound, iv) device speed(s) of the online communication device 104, v) data indicating connection(s) to a WiFi network by the online communication device 104, or vi) an image or images captured by a camera of the online communication device 104. They gathering of the device data by components of the online communication devices 104 is described below with respect to FIG. 3.

Upon gathering the device data, each of the online communication devices 104 may provide the device data to the proximity service 118 or may determine proximity of the user 102 based on the device data. Prior to determining proximity, the online communication device 104 or the proximity service 118 may perform one or more operations on device data to determine, for example, whether the online communication device 104 is moving. If multiple electronic compass readings or base station identifiers indicate motion, the online communication device 104 or the proximity service 118 may determine that the online communication device 104 is moving. Further, one or more accelerometer readings may indicate that the online communication device 104 is moving.

Determination of proximity by either the online communication device 104 or the proximity service 118 may be based on rules, criteria, and/or models. For example, the online communication device 104 or the proximity service 118 may compare an item of device data, such as a device speed or heat sensor reading, to a threshold or to a model. A model may be used because there may be expected fluctuations of the item of device data, and a simply threshold may not adequately account for the fluctuations. The models may also include a model of the user's voice that may be used to detect that voice in an audio input stream of ambient sound. Further, the online communication device 104 or the proximity service 118 may apply rules requiring that either a single item of device data meet a threshold or model, that or a combination of items of device data meet thresholds or models ("meet a model" means that an item of device data be either outside of a range of data gathered when a user is not proximate or inside a range of data gathered when a user is proximate). The use of a combination allows the online communication device 104 or the proximity service 118 to determine user proximity with a higher degree of confidence. For example, a device speed or data from an accelerometer or electronic compass indicates that the online communication device 104 is moving, and movement may be indicative of user proximity. In some circumstances (e.g., plane flight, where the online communication device 104 is in baggage), the data indicating movement may be a false positive. Accordingly, the online communication device 104 or the proximity service 118 may require that an additional factor (e.g., user voice or a heat sensor reading) be met in order to determine user proximity. If user proximity is determined by the online communication device 104, the online communication device 104 may then provide proximity information indicative of the proximity determination to the proximity service 118.

In various embodiments, upon determining user proximity or upon receiving proximity information, the proximity service 118 may select one or more of the online communication devices 104 based on the determined proximity or proximity information. If only a single online communication device is proximate to the user 102 (as is illustrated in FIG. 1 with online communication device 104a), the proximity service 118 selects that online communication device 104. If multiple online communication devices 104 are proximate to a user 102, the proximity service 118 may select among them based on user preference(s) (e.g., a preference for message delivery to a smart phone over a tablet computer) or may simply select all of the proximate online communication devices 104. Upon selecting the one or more proximate online communication devices 104, the proximity service 118 either notifies the one or more communication services 110 of the selection or makes that information available to the one or more communication services 110. If no online communication devices 104 are proximate to the user 102, the proximity service 118 may notify the one or more communication services 110 or may make that information available to the one or more communication services 110.

Upon receiving or retrieving the selection of the one or more online communication devices 104, the communication service(s) 110 may transmit any messages or other communications 120 directed to an account of the user 102 to the selected one or more online communication devices 104. The retrieving or receiving may be performed periodically or on an event-driven basis. For example, when a message or communication 120 directed to the account of the user 102 is received, a communication service may receive or retrieve the selection of the one or more online communication devices 104. If, in contrast, the selection is retrieved or received periodically, that selection is used for a period of time for any incoming messages or communications 120 directed to the account of the user 102. In some embodiments, if no online communication device is proximate to the user 102, the communication service(s) 110 may queue the messages or communications 120 until an online communication device 102 is proximate to the user 102.

In some embodiments, in addition to transmitting the message or communication 120 to the selected one or more online communication devices 104, the communication service(s) 110 may transmit the message or communication 120 to other online communication device(s) 104 based on user preferences, regardless of whether those other online communication device(s) 104 are proximate to the user 102. For example, the user 102 may have a preference that messages or communications 120 always be transmitted to the user's tablet computer.

In further embodiments, the communication service(s) 110 may determine that a message or communication 120 remains unread on the selected online communication device(s) 104 to which the message or communication 120 was transmitted. The communication service(s) 110 may make this determination if the message or communication 120 is unread after a period of time starting when the message or communication 120 was transmitted. The communication service(s) 110 may then transmit the unread message or communication 120 to the other online communication devices 104 of the user 102. Alternatively or additionally, the communication service(s) 110 may make this determination when the communication service(s) 110 receives or retrieves information indicating that the user 102 is proximate to a different online communication device 104. The communication service(s) 110 may then transmit the unread message to the different online communication device 104.

In various embodiments, the communication service(s) 110 may periodically synchronizing messages and communications 120 across the online communication devices 104 of the user 102, delivering the messages and communication 120 to those other online communication devices 104 as they become proximate to the user 102 or after a period of time.

Example Remote Service Device

Figure 2:
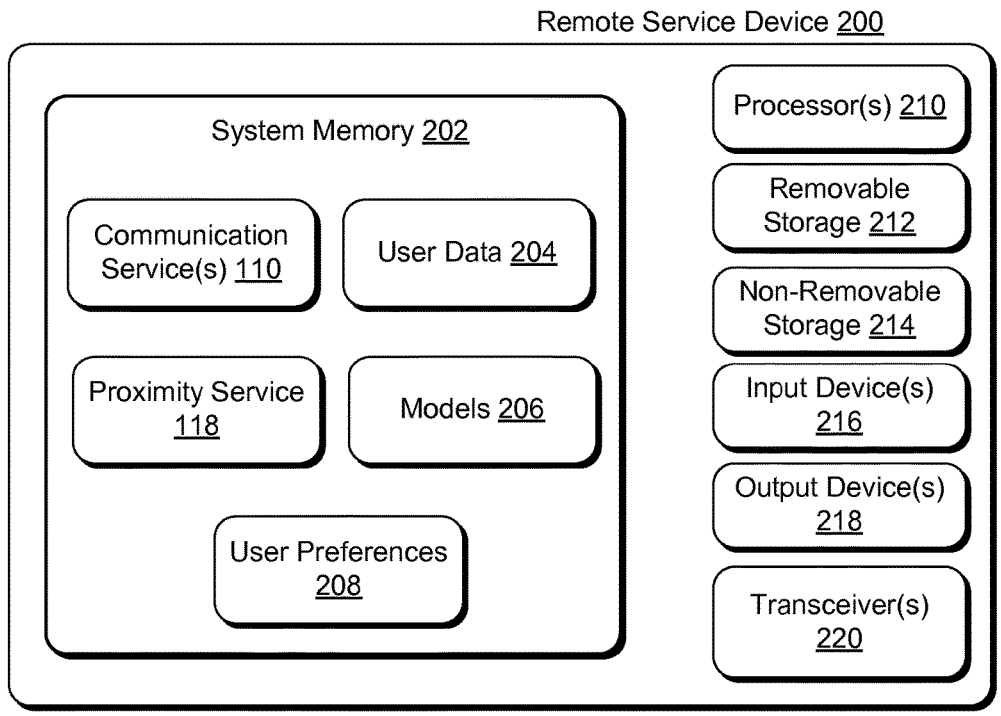
FIG. 2 illustrates an example remote service device configured to select an online communication device based on proximities of online communication devices to a user and to transmit a communication to the selected online communication device.

FIG. 2 illustrates an example remote service device configured to select an online communication device based on proximities of online communication devices to a user and to transmit a communication to the selected online communication device. While the remote service device 200 is represented as a single device of the remote service 106, it is to be understood that the remote service device 200 may be a plurality of devices with modules and data distributed among them. For example, the communication service 110 and proximity service 118 could be implemented on different devices 200 of the remote service 106.

As illustrated, the remote service device 200 comprises a system memory 202 storing a communication service 110, user data 204, a proximity service 118, models 206, and user preferences 208. Also, the remote service device 200 includes processor(s) 210, a removable storage 212 and non-removable storage 214, input device(s) 216, output device(s) 218, and transceivers 220.

In various embodiments, system memory 202 is volatile (such as RAM), non-volatile (such as ROM, flash memory, etc.) or some combination of the two. The communication service 110, user data 204, proximity service 118, models 206, and user preferences 208 stored in the system memory 202 may comprise methods, threads, processes, applications or any other sort of executable instructions. The communication service 110, user data 204, proximity service 118, models 206, and user preferences 208 may also include files and databases. Further description of the communication service 110 and the proximity service 118 is provided above.

The user data 204 may be data utilized by the communication service(s) 110 to determine whether the user 102 is online and to authenticate the user 102 when the user logs in. Thus, the user data 204 may comprise a list of the communication devices of the user 102 that are online communication devices 104. Also, that list may be maintained and updated based on log-ins or authentications using the log-in/authentication information maintained in the user data 204.

The models 206 may be models specific to types of device data of individual online communication devices 104 or to types of device data across multiple online communication devices 104. For example, a model of the voice of the user 102 may be used across all of the online communication devices 104 of the user 102. Heat sensor readings may, in contrast, be specific to an individual online communication device 104 of the user 102. The models 206 may be used by the proximity service 118 in the manner described above.

The user preferences 208 may be transmission preferences specific to the user 102 that are used by the proximity service 118 in selecting online communication device(s) 104 and/or used by the communication service(s) 110 in determining which online communication device(s) 104 messages or communications 120 should be transmitted to. For example, the user preferences 208 may specify that the user 102 prefers messages or communications 120 be transmitted to a smart phone rather than a tablet computer when booth are proximate to the user 102. Further, the user preferences 208 may include a preference that messages or communications 120 always be transmitted to a smart phone of the user 102, regardless of whether the smart phone is proximate to the user 102.

In some embodiments, the processor(s) 210 is a central processing unit (CPU), a graphics processing unit (GPU), or both CPU and GPU, or other processing unit or component known in the art.

The remote service device 200 also includes additional data storage devices (removable and/or non-removable) such as, for example, magnetic disks, optical disks, or tape. Such additional storage is illustrated in FIG. 2 by removable storage 212 and non-removable storage 214. Tangible computer-readable media may include volatile and nonvolatile, removable and non-removable media implemented in any method or technology for storage of information, such as computer readable instructions, data structures, program modules, or other data. System memory 202, removable storage 212 and non-removable storage 214 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the remote service device 200. Any such tangible computer-readable media may be part of the remote service device 200.

The remote service device 200 also has input device(s) 216, such as a keypad, a cursor control, a touch-sensitive display, voice input device, etc., and output device(s) 218 such as a display, speakers, etc. These devices are well known in the art and need not be discussed at length here.

As illustrated in FIG. 2, the remote service device 200 also includes one or more wireless transceivers 220. To increase throughput, the wireless transceivers 220 may utilize multiple-input/multiple-output (MIMO) technology. The wireless transceivers 220 may be any sort of wireless transceivers capable of engaging in wireless, radio frequency (RF) communication. The wireless transceivers 220 may also include other wireless modems, such as a modem for engaging in WiFi, WiMax, Bluetooth, or infrared communication.

Example Online Communication Device

FIG. 3 illustrates an example online communication device configured to determine device data indicative of user proximity and, optionally, to determine proximity of a user based on the device data. As illustrated, online communication device 104 comprises a system memory 302 storing online communication clients 304, a proximity client 306, models 308, and user preferences 310. Also, the online communication device 104 includes processor(s) 312, a removable storage 314 and non-removable storage 316, a heat sensor 318, GPS 320, an electronic compass 322, an accelerometer 324, a microphone 326, a camera 328, input device(s) 330, output device(s) 332, and transceivers 334.

In various embodiments, system memory 302 is volatile (such as RAM), non-volatile (such as ROM, flash memory, etc.) or some combination of the two. The online communication clients 304, a proximity client 306, models 308, and user preferences 310 stored in the system memory 302 may comprise methods, threads, processes, applications or any other sort of executable instructions. The online communication clients 304, a proximity client 306, models 308, and user preferences 310 may also include files and databases.

In some embodiments, online communication client(s) 304 may be applications of the online communication device 104 associated with corresponding communication service(s) 110 (e.g., an instant messaging client for an instant messaging service). These online communication client(s) 304 may be logged into or otherwise authenticated with their corresponding communication service(s) 110 and are thus referred to as "online." The online communication client(s) 304 may send messages or other communications and may receive messages or other communications 120. The online communication client(s) 304 may also respond to status requests from their corresponding communication service(s) 110 inquiring as to whether particular messages or other communications 120 are read or unread.

In various embodiments the proximity client 306 may receive device data from any or all of the heat sensor 318, the GPS 320, the electronic compass 322, the accelerometer 324, the microphone 326, the camera 328, the other input device(s) 330, or the wireless transceiver(s) 334. Using this device data, the proximity client 306 may determine proximity of the user 102, in the manner described above, and may provide an indication of that determined proximity to the proximity service 118 as proximity information 116. Alternatively, the proximity client 306 may provide the received device data to the proximity service 118 as device data 116 that is used by the proximity service 118 to determine the proximity of the user 102 to the online communication device 104.

In further embodiments, models 308 may be models specific to types of device data. For example, the models 308 may include a model of the voice of the user 102 or a model of heat sensor readings. The models 308 may be used by the proximity client 306 in the manner described above.

In various embodiments, user preferences 310 may be transmission preferences specific to the user 102 that are used by the proximity service 118 in selecting online communication device(s) 104 and/or used by the communication service(s) 110 in determining which online communication device(s) 104 messages or communications 120 should be transmitted to. These user preferences 310 may be entered by the user 102 on the online communication device 104 and transmitted to the proximity service 118 and/or communication service(s) 110, as appropriate.

In some embodiments, the processor(s) 312 is a central processing unit (CPU), a graphics processing unit (GPU), or both CPU and GPU, or other processing unit or component known in the art.

The online communication device 104 also includes additional data storage devices (removable and/or non-removable) such as, for example, magnetic disks, optical disks, or tape. Such additional storage is illustrated in FIG. 3 by removable storage 314 and non-removable storage 316. Tangible computer-readable media may include volatile and nonvolatile, removable and non-removable media implemented in any method or technology for storage of information, such as computer readable instructions, data structures, program modules, or other data. System memory 302, removable storage 314 and non-removable storage 316 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the online communication device 104. Any such tangible computer-readable media may be part of the online communication device 104.

In some embodiments, the heat sensor 318 may be any sort of instrumentality capable of measuring heat, as well as logical interfaces coupled to the instrumentality and capable of delivering or providing a heat reading to the proximity client 306. For example, the heat sensor 318 may be a heat sensor coupled to a battery of the online communication device 104

The GPS 320 may be functionality and logic capable of wirelessly communicating with a GPS system to receive GPS locations, such as GPS coordinates, from the GPS system. The GPS 320 may expose those GPS locations to a platform or applications of the online communication device 104, such as the proximity client 306.

The electronic compass 322 may capture directional orientations of the online communication device 104 and may expose those orientations (e.g., facing north-northwest) to a platform or applications of the online communication device 104, such as the proximity client 306.

The accelerometer 324 measures acceleration of the online communication device 104 and may expose that/those acceleration measurements to a platform or applications of the online communication device 104, such as the proximity client 306.

The microphone 326 may be any sort of microphone capable of capturing ambient sound when activated and of providing that recorded ambient sound to a platform or applications of the online communication device 104, such as the proximity client 306.

In various embodiments, the camera 328 may be any sort of camera capable of capturing an image or images and of exposing the image or images to a platform or applications of the online communication device 104, such as the proximity client 306.

Online communication device 104 also has other input device(s) 330, in addition to the microphone 326 and camera 328, such as a keypad, a cursor control, a touch-sensitive display, etc. Also, the online communication device 104 includes output device(s) 332, such as a display, speakers, etc. These devices are well known in the art and need not be discussed at length here.

As illustrated in FIG. 3, the online communication device 104 also includes one or more wireless transceivers 334. To increase throughput, the wireless transceivers 334 may utilize multiple-input/multiple-output (MIMO) technology. The wireless transceivers 334 may be any sort of wireless transceivers capable of engaging in wireless, radio frequency (RF) communication. The wireless transceivers 334 may also include other wireless modems, such as a modem for engaging in WiFi, WiMax, Bluetooth, or infrared communication. In some embodiments, the wireless transceivers 334 may also identify base station(s) or access point(s) that the wireless transceivers 334 connect to and may expose those identities to a platform or applications of the online communication device 104, such as the proximity client 306.

Example Processes

Figure 4:
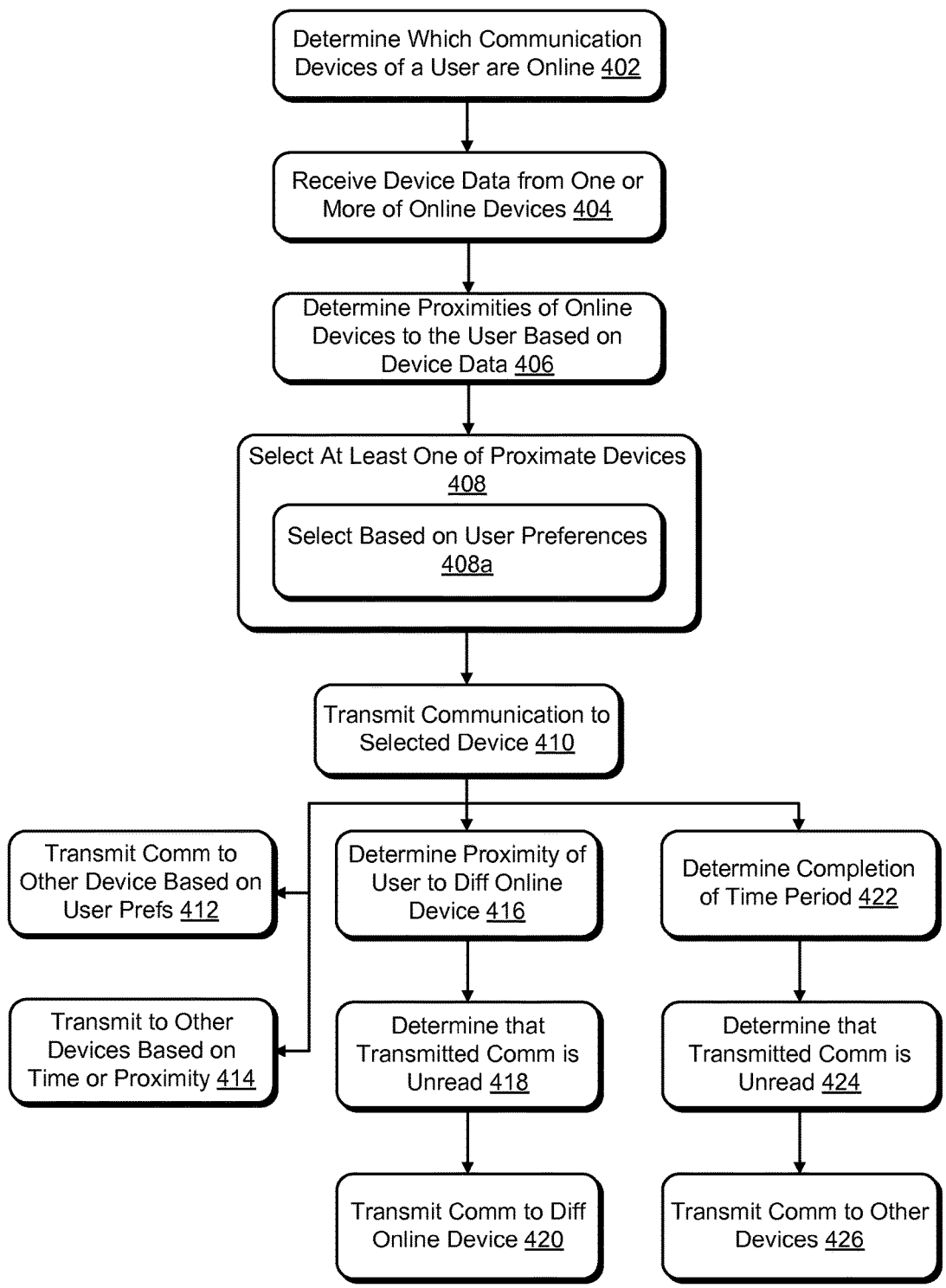
FIG. 4 illustrates an example process for determining proximity of a user to one or more online communication devices of the user, selecting at least one of the online communication devices based on the determined proximity, and transmitting a communication to the selected online communication device.
Figure 5:
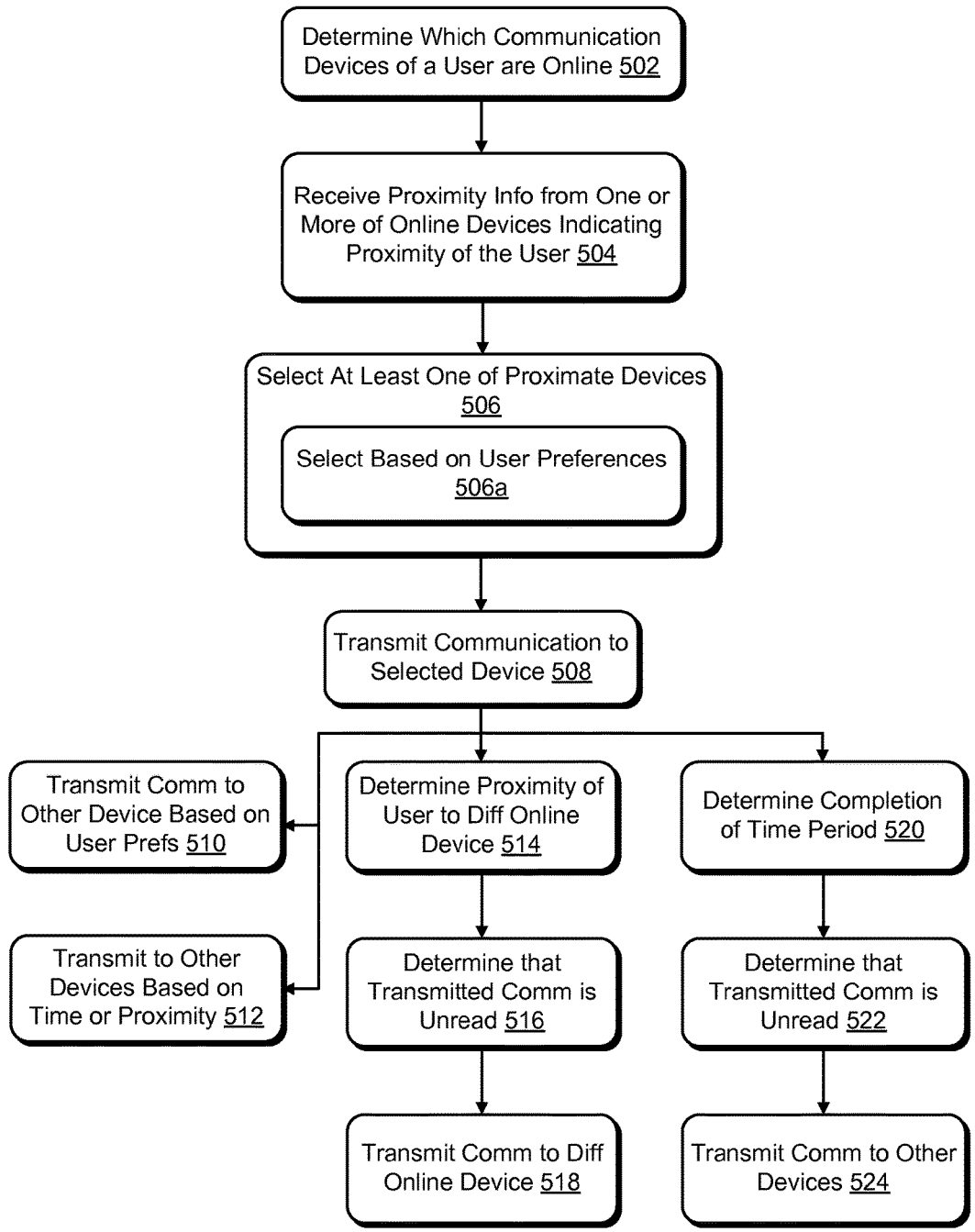
FIG. 5 illustrates an example process for receiving proximity information indicative of proximity of a user to one or more online communication devices of the user, selecting at least one of the online communication devices based on the proximity information, and transmitting a communication to the selected online communication device.

FIGS. 4-5 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates an example process for determining proximity of a user to one or more online communication devices of the user, selecting at least one of the online communication devices based on the determined proximity, and transmitting a communication to the selected online communication device. The process includes, at 402, determining that a plurality of communication devices of a user are online with respect to a communication service. The communication service may be associated with one of an instant messaging application, a video call client, a voice call application, a social networking application, an email application a game, a text messaging application, a media player, or a mobile wallet.

At 404, a proximity service receives device data indicative of whether the user is proximate to one or more of the plurality of online communication devices. The one or more of the plurality of online communication devices may be a subset of the plurality of online communication devices. The device data may include one or more of i) data indicating activity of accelerometers or electronic compasses of the one or more online communication devices, ii) readings of heat sensors of the one or more online communication devices, iii) data indicating detection of the user's voice in ambient sound, iv) device speeds of the one or more online communication devices, v) data indicating connections to a WiFi network by the one or more online communication devices, or vi) image(s) captured by camera(s) of the one or more online communication devices. The device speeds may be determined using cell site handover information or global positioning system (GPS) information. Also, each of the one or more online communication devices may use a model of accelerometer data, electronic compass data, heat sensor readings, voice or sound data, or device speed data. Further, the one or more online communication devices may utilize rules or criteria to select factors to use in determining the proximity of the user. In some embodiments, the proximity service utilizes a combination of at least two of factors i)-v).

At 406, the proximity service determines proximity of the user to the one or more online communication devices based on the device data.

At 408, the proximity service selects one of the online communication devices based at least in part on the determined proximity. At 408a, the proximity service further selects the one of the online communication devices based on a user preference for selecting among multiple proximate, online communication devices.

At 410, the communication service transmits a communication to the selected online communication device.

At 412, based on a user preference, the communication service transmits the communication to an additional one of the plurality of online communication devices regardless of whether the additional one of the plurality of online communication devices is proximate to the user.

At 414, the communication service transmits the communication to others of the plurality of online communication devices when user is proximate to those others of the plurality of online communication devices or after completion of a time period beginning when the communication is transmitted to the selected online communication device.

At 416, the proximity service determines that the user proximate at a different online communication device than the selected online communication device. At 418, the communication service determines that the transmitted communication is unread on the selected online communication device. At 420, the communication service then transmits the communication to the different online communication device.

At 422, the communication service determines the completion of a time period beginning when the communication is transmitted to the selected online communication device. At 424, the communication service determines that the transmitted communication is unread on the selected online communication device. At 426, the communication device then transmits the communication to one or more others of the plurality of online communication devices.

FIG. 5 illustrates an example process for receiving proximity information indicative of proximity of a user to one or more online communication devices of the user, selecting at least one of the online communication devices based on the proximity information, and transmitting a communication to the selected online communication device. The process includes, at 502, determining that a plurality of communication devices of a user are online with respect to a communication service. The communication service may be associated with one of an instant messaging application, a video call client, a voice call application, a social networking application, an email application a game, a text messaging application, a media player, or a mobile wallet.

At 504, a proximity service receives proximity information indicating whether the user is proximate to one or more of the plurality of online communication devices. The one or more of the plurality of online communication devices may be a subset of the plurality of online communication devices. The proximity information reflects determinations of user proximity made by the one or more online communication devices based on device data of those online communication devices. The device data may include one or more of i) data indicating activity of accelerometers or electronic compasses of the one or more online communication devices, ii) readings of heat sensors of the one or more online communication devices, iii) data indicating detection of the user's voice in ambient sound, iv) device speeds of the one or more online communication devices, v) data indicating connections to a WiFi network by the one or more online communication devices, or vi) image(s) captured by camera(s) of the one or more online communication devices. The device speeds may be determined using cell site handover information or global positioning system (GPS) information. Also, each of the one or more online communication devices may use a model of accelerometer data, electronic compass data, heat sensor readings, voice or sound data, or device speed data. Further, the one or more online communication devices may utilize rules or criteria to select factors to use in determining the proximity of the user. In some embodiments, the proximity service utilizes a combination of at least two of factors i)-v).

At 506, the proximity service selects one of the online communication devices based at least in part on the proximity information. At 506a, the proximity service further selects the one of the online communication devices based on a user preference for selecting among multiple proximate, online communication devices.

At 508, the communication service transmits a communication to the selected online communication device.

At 510, based on a user preference, the communication service transmits the communication to an additional one of the plurality of online communication devices regardless of whether the additional one of the plurality of online communication devices is proximate to the user.

At 512, the communication service transmits the communication to others of the plurality of online communication devices when user is proximate to those others of the plurality of online communication devices or after completion of a time period beginning when the communication is transmitted to the selected online communication device.

At 514, the proximity service determines that the user proximate at a different online communication device than the selected online communication device. At 516, the communication service determines that the transmitted communication is unread on the selected online communication device. At 518, the communication service then transmits the communication to the different online communication device.

At 520, the communication service determines the completion of a time period beginning when the communication is transmitted to the selected online communication device. At 522, the communication service determines that the transmitted communication is unread on the selected online communication device. At 524, the communication device then transmits the communication to one or more others of the plurality of online communication devices.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A system comprising:
one or more processors;
a proximity service operated by the one or more processors to:
receive device data from a plurality of online communication devices of a particular user, each of which has installed thereon a client of a communication service associated with a single user account of the particular user;

determine, based at least in part on the device data, that the particular user is proximate to a first online communication device of the plurality of online communication devices;

in response to a determination that the particular user is proximate to the first online communication device, trigger the communication service operated by the one or more processors to transmit a textual or voice communication to the first online communication device associated with the single user account of the particular user via a cellular network using a first wireless connectivity service plan for the first online communication device that the particular user has with the cellular network;

in response to a determination that the textual or voice communication is unread or unheard on the first online communication device following an expiration of a time period that begins when the textual or voice communication is transmitted to the first online communication device, trigger the communication service to transmit the textual or voice communication to a second online communication device associated with the single user account of the particular user via the cellular network using a second wireless connectivity service plan for the second online communication device that the particular user has with the cellular network.

2. The system of claim 1, wherein the textual or voice communication is associated with one of an instant messaging client, a video call client, a voice call client, a social networking client, an email client, a game client, a text messaging client, a media player client, or a mobile wallet client.

3. The system of claim 2, wherein the plurality of online communication devices are online with respect to the one of the instant messaging client, the video call client, the voice call client, the social networking client, the email client, the game client, the text messaging client, the media player client, or the mobile wallet client.

4. A computer-implemented method comprising:

receiving, from individual ones of a plurality of communication devices of a particular user each of which has installed thereon a client of a communication service associated with a single user account of the particular user, proximity information indicating proximity of the particular user to individual ones of the plurality of communication devices;

determining that none of the plurality of communication devices are proximate to the particular user based at least in part on the received proximity information;

queuing a textual or voice communication for the particular user until a communication device of the plurality of communication devices is proximate to the particular user; and transmitting the textual or voice communication to a communication device of the particular user following the communication device being determined to be proximate to the particular user.

5. The method of claim 4, wherein the textual or voice communication is associated with one of an instant messaging client, a video call client, a voice call client, a social networking client, an email client, a game client, a text messaging client, a media player client, or a mobile wallet client.

6. The method of claim 5, wherein the plurality of communication devices are online with respect to the one of the instant messaging client, the video call client, the voice call client, the social networking client, the email client, the game, the text messaging client, the media player client, or the mobile wallet client.

7. The method of claim 4, wherein the device speeds are determined using cell site handover information or global positioning system (GPS) information.

8. The method of claim 4, wherein each of the plurality of communication devices uses a model of accelerometer data, electronic compass data, heat sensor readings, voice or sound data, or device speed data.

9. The method of claim 4, wherein the proximity information comprises one or more of:

i) activity of accelerometers or electronic compasses of individual ones of the plurality of communication devices of the particular user, ii) readings of heat sensors of individual ones of the plurality of communication devices, iii) detection of a voice in ambient sound, iv) device speeds of individual ones of the plurality of communication devices, or v) one or more images captured by a camera of individual ones of the plurality of communication devices.

10. The method of claim 4, wherein individual ones of the plurality of communication devices utilize rules or criteria to select factors to use in determining the proximity of the user.

11. The method of claim 4, wherein the transmitting is further based on a user preference to transmit to a specific communication device among the plurality of communication devices.

12. The method of claim 4, further comprising transmitting the textual or voice communication to one or more others of the plurality of communication devices regardless of whether the one or more others of the plurality of communication devices is proximate to the user.

13. The method of claim 4, further comprising transmitting the textual or voice communication to one or more others of the plurality of communication devices in response to determining that the user is proximate to the one or more others of the plurality of communication devices.

14. The system of claim 1, wherein:

the proximity service is further operated by the one or more processors to:

subsequently determine that the user is more proximate to a third online communication device than to the first online communication device and the second online communication device; and determine that the transmitted textual or voice communication is unread or unheard on the first online communication device and the second online communication device; and the communication service is further operated by the one or more processors to transmit the textual or voice communication to the third online communication device.

15. The system of claim 1, wherein:

the proximity service is further operated by the one or more processors to, following an additional time period beginning when the textual or voice communication is transmitted to the first online communication device and the second online communication device, determine that the textual or voice communication is unread or unheard on the second online communication device; and the communication service is further operated by the one or more processors to transmit the textual or voice communication to one or more others of the plurality of online communication devices.

16. The method of claim 10, wherein the rules or the criteria comprise a range of values, the selected factors being associated with detected values that are within the range of values.

17. A system comprising:
one or more processors; and
memory storing instructions executable by the one or more processors to:
receive, from individual ones of a plurality of communication devices of a particular user each of which has installed thereon a client of a communication service associated with a single user account of the particular user, proximity information indicating proximity of the particular user to individual ones of the plurality of communication devices;
determine that none of the plurality of communication devices are proximate to the particular user based at least in part on the received proximity information;
queue a textual or voice communication for the particular user until an online communication device of the plurality of communication devices is proximate to the particular user; and
transmit the textual or voice communication to a communication device of the particular user following the communication device being determined to be proximate to the particular user.

18. The system of claim 17, wherein individual ones of the plurality of communication devices utilize rules or criteria to select factors to use in determining the proximity of the user.

19. The system of claim 17, further comprising transmitting the textual or voice communication to one or more others of the plurality of communication devices based on a user preference.

* * * * *